Nov. 24, 1936.  C. L. WILSON  2,061,689
DELIVERY WINDOW FOR VEHICLES
Filed Nov. 25, 1935
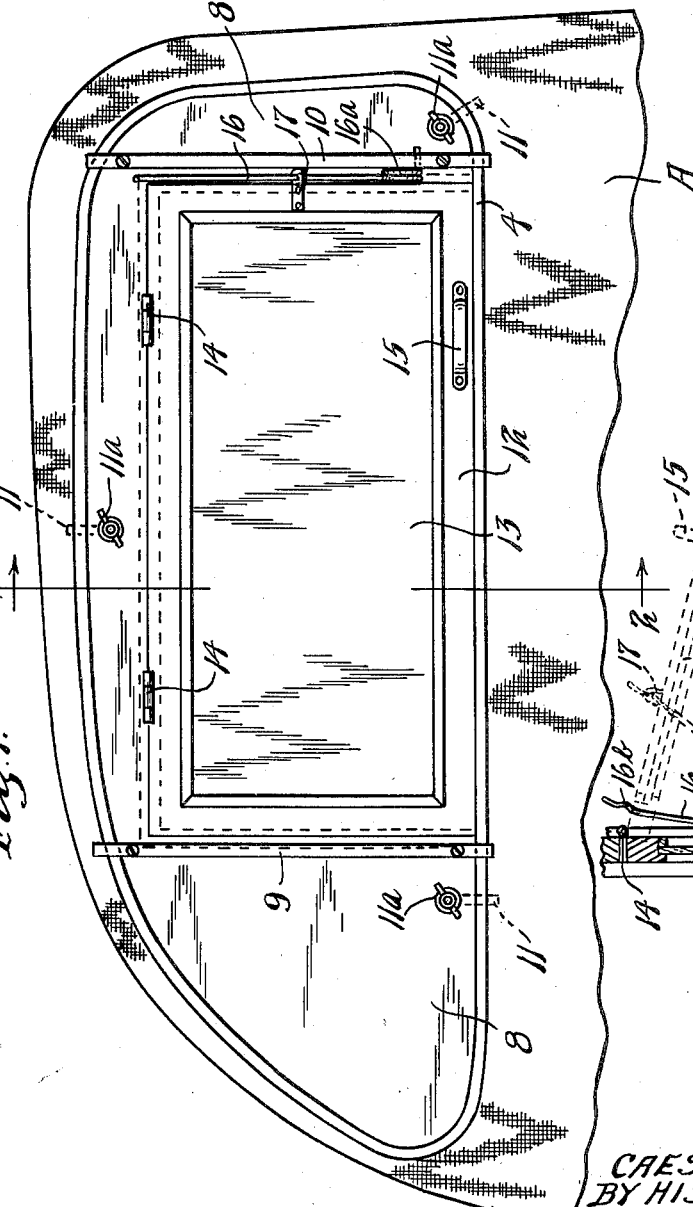
INVENTOR.
CAESAR L. WILSON.
BY HIS ATTORNEYS.
Williamson & Williamson Patented Nov. 24, 1936

2,061,689

UNITED STATES PATENT OFFICE 2,061,689

DELIVERY WINDOW FOR VEHICLES

Caesar L. Wilson, Dassel, Minn.

Application November 25, 1935, Serial No. 51,387

2 Claims. (Cl. 296—44)

This invention relates to delivery windows for vehicles.

It is the general object of this invention to provide a delivery window which can be used in vehicles, such as automobiles and can be readily and quickly operated as by a rural delivery mail carrier for making frequent deliveries of goods through the window in cold weather.

The objects and advantages of the invention will more fully appear from the following description, made in connection with the accompanying drawing, wherein like reference characters refer to the same or similar parts throughout the various views, and in which, Fig. 1 is a view in side elevation looking toward the inner side of a door panel of an automobile equipped with the delivery window of the invention;

Fig. 2 is a vertical section taken on the line 2—2 of Fig. 1, as indicated by the arrows; and Fig. 3 is a view showing portions of the device as illustrated in Fig. 2 in full lines and showing the movable parts in a second position in dotted lines.

Referring to the drawing, portions of the front right hand door A of an automobile are illustrated, which include inner window frame 4, outer window frame 5 and glass 6 adapted for movement between the inner and outer frames and having its side edges received and its upper edge adapted to be received within a channel shaped rubber 7 mounted between the inner and outer frames.

Fitting within the opening of the inner frame 4 is a panel 8 carrying vertical cleats 9 and 10 respectively at its inner side which project upwardly and downwardly from the panel and bear against the inner side of the inner frame 4. These cleats 9 and 10 prevent removal of the panel outwardly through the window opening of the door A. Also mounted in the panel 8 are a number of angular lugs 11 (three in number in the illustrated embodiment) and these lugs have screw threaded shanks projecting through the panel 8 and they have arms set at right angles to the shanks which bear against the outer side of the inner frame 4. Wing nuts 11a are screwed onto the shanks of the lugs 11 to bear against the inner side of the panel 8 whereby the arms of the lugs may be tightened against the outer side of the inner frame 4. The lugs 11 and wing nuts 11a prevent removal of panel 8 inwardly from the window opening of the door and at the same time they act as detachable connections for retaining the panel in place.

The panel 8 has a rectangular opening therein extending from the lower edge of the panel upwardly and this opening is normally closed by a door 12 consisting of a frame carrying a glass or other light 13. The door 12 is secured by hinges 14 at its upper edge to the panel 8 to permit the door to be swung inwardly and upwardly, from its normally closed position. The lower edge of the door is equipped with a handle 15.

Secured at its lower end to panel 8 is a spring 16 or peculiar shape. This spring is of rod-like form and immediately above its lower end the spring forms a coil 16a to give it greater resiliency and it then projects upwardly through an apertured keeper 17 mounted on the door 12. Near its upper end the spring 16 is provided with a nose 16b, for retentive engagement with keeper 17.

Assuming that the glass 6 of the automobile is in downwardly slid position, as shown in Fig. 2, it is readily possible to apply the door carrying panel 8 to the door A. Of course, the panel will be inserted within the inner frame 4 of the door from the inside of the vehicle by first loosening the wing nuts 11a and swinging the arms of the lugs 11 within the outline of the panel 8. The arms of the lugs 11 will then be swung to the position shown to engage the outer side of the frame 4 whereupon the wing nuts 11a may be tightened up. The spring 16 bearing against the keeper 17, through which a portion of the spring extends, will normally maintain the door 12 in closed relation. To raise the door 12 as to make a delivery through the opening in the panel 8, it is merely necessary for the driver of the vehicle to grasp the handle 15 and swing the door 12 upwardly from the position shown in Figs. 1 and 2 and in full lines Fig. 3 to the dotted line position shown in Fig. 3. The upper part of the spring 16 will move outwardly as this action takes place, and the keeper 17 will, of course, be slid upwardly along the spring until when the door 12 is raised sufficiently the keeper is received within the nose 16b of the spring. When this occurs, the handle 15 may be released, whereupon the engagement between the nose 16b of the spring and the keeper 17 will retain the door 12 in the raised position so that a delivery can be quickly and easily made through the opening in panel 8. After the delivery has been made, the door 12 may be easily swung downwardly to a closed position, the friction between the spring 16 and the keeper 17 not being sufficient to prevent this movement.

The device of the invention is particularly useful to rural delivery mail carriers who must make their deliveries in all kinds of weather from automobiles or other vehicles to rural delivery mail boxes. The door 12 is readily manipulated by the mail carrier with but very little effort.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A delivery window for vehicles comprising a panel adapted to be received within the window opening of a vehicle, means for attaching said panel to the window frame of the vehicle, said panel having an opening therein, a glazed frame hinged at its upper edge to said panel and normally closing the opening in said panel but being capable of being swung upwardly and inwardly out of said opening, a keeper mounted on said glazed frame and a spring secured to said panel, said spring having a coil near its secured end and said spring projecting through said keeper and acting in cooperation with said keeper to retain said glazed frame in both closed and open position.

2. A delivery window for vehicles, comprising a panel adapted to be received within the window opening of a vehicle, means for attaching said panel to the window frame of the vehicle, said panel having an opening therein, a glazed frame hinged at its upper edge to said panel and normally closing the opening in said panel but being capable of being swung upwardly and inwardly out of said opening, a keeper mounted on said glazed frame and a spring secured to said panel at its lower end, said spring projecting upwardly through said keeper and bearing thereagainst under pressure, said spring having a nose near its upper end engageable with said keeper to retain the glazed frame in open position.

CAESAR L. WILSON.